United States Patent [19]

Chiecchi

[11] Patent Number: 4,461,069

[45] Date of Patent: Jul. 24, 1984

[54] DEVICE FOR INTRODUCING ANTI-MICROPHONY SPONGE INTO AN AIR-CORED COIL

[75] Inventor: Cesare Chiecchi, Vidardo, Italy

[73] Assignee: U.S. Philips Corporation, New York, N.Y.

[21] Appl. No.: 311,564

[22] Filed: Oct. 15, 1981

Related U.S. Application Data

[62] Division of Ser. No. 94,627, Nov. 15, 1979, Pat. No. 4,322,894.

[30] Foreign Application Priority Data

Nov. 17, 1978 [IT] Italy ............................ 29904/78[U]

[51] Int. Cl.[3] ............................................ B23P 23/00

[52] U.S. Cl. ................................ 29/564.8; 29/564.6; 29/564.7; 29/235; 29/451; 336/185; 336/195; 336/208

[58] Field of Search ....................... 336/208, 185, 195; 29/564.6, 564.8, 564.7, 235, 451

[56] References Cited

U.S. PATENT DOCUMENTS

| | | | |
|---|---|---|---|
| 1,702,031 | 2/1929 | Wesseler | 29/235 |
| 3,145,464 | 8/1964 | Green | 29/235 X |
| 3,707,693 | 12/1972 | Hatton | 336/208 X |
| 3,894,328 | 7/1975 | Jansson | 29/235X |

*Primary Examiner*—J. V. Truhe

*Assistant Examiner*—Susan Steward

*Attorney, Agent, or Firm*—Robert T. Mayer; Bernard Franzblau

[57] ABSTRACT

A device for introducing an anti-microphony sponge into an air-cored coil for television channel selectors, comprising an axially displaceable hollow mandrel with an end portion which comprises two diametrically oppositely situated slots. Two blocking members can be introduced into the slots, after which cutting means are displaceable in a direction transversely of the axis of the mandrel. After the introduction of a length of spongy material into the mandrel, an air-cored coil is arranged on the end portion of the mandrel, after which the blocking members are moved into the slots so that the length of spongy material is clamped on both sides of the air-cored coil. Subsequently, the mandrel is withdrawn from the coil and the length of spongy material is cut in the zone between the blocking means and the withdrawn mandrel so that a piece of spongy material is left behind in the air-cored coil. The blocking members return to their starting position and the air-cored coil with the piece of spongy material is discharged from the device.

9 Claims, 10 Drawing Figures

DEVICE FOR INTRODUCING ANTI-MICROPHONY SPONGE INTO AN AIR-CORED COIL

This is a division, of application Ser. No. 94,627, filed Nov. 15, 1979, now U.S. Pat. No. 4,322,894 issued Apr. 2, 1982.

The invention relates to a device for introducing an anti-microphony sponge into an air-cored coil for television channel selectors.

The introduction of pieces of sponge into air-cored coils for television channel selectors in order to prevent microphony in these coils is known per se.

Thus far, the sponges were introduced by hand after the winding of the coil on a winding machine.

The present invention has for an object to provide a device such that this operation can be executed in a faster and more efficient manner.

This object is achieved in accordance with the invention in that a length of a spongy material is introduced into a sleeve so that the end portion of the length is enclosed by the sleeve. An air-cored coil, whose inner diameter is substantially equal to the outer diameter of the sleeve is then slid onto the sleeve, after which the air-cored coil is blocked in the axial direction and the end portion of the length of spongy material is clamped on both sides of the air-cored coil. The sleeve is subsequently withdrawn from the blocked air-cored coil and is slid over the clamped length so that the portion of the length enclosed by the sleeve is exposed and engages the inner circumference of the air-cored coil, the portion of the length which is enclosed by the air-cored coil is then separated from the portion of the length situated in the sleeve, and ultimately the blocking of the air-cored coil and the clamping of the sponge introduced into the air-cored coil is removed so that the air-cored coil with anti-microphony sponge thus obtained is released.

Using the method and device described above, the introduction of pieces of sponge into air-cored coils for television channel selectors can be simply performed at a very high rate.

The device in accordance with the invention is characterized in that it comprises an axially displaceable mandrel which comprises a cylindrical end portion having an axial bore and around which a coil can be arranged. The axial bore serves to accommodate a length of a spongy material. The device includes a set of diametrically oppositely situated slots in the cylindrical end portion of the mandrel and two blocking members which can be displaced towards the axis of the mandrel from opposite directions until they project into the slots, thus enclosing and clamping said length of spongy material on both sides of the coil. Means are provided for the axial displacement of the mandrel which is displaced after the introduction of the blocking members into the slots, the end portion of the mandrel then being withdrawn from the coil. Also included are cutting means which are displaceable transversely of the axis of the mandrel and which serve to cut off a piece of sponge in the zone between the blocking members and the withdrawn end portion of the mandrel.

The device in accordance with the invention preferably comprises means for supplying compressed air which are activated simultaneously with a return movement of the blocking members in order to discharge the coil with the introduced, cut-off piece of sponge.

The main advantage of the device in accordance with the invention, of course, is the fact that manual operation is replaced by a mechanical operation so that the manufacturing tolerances are much more constant and more accurate. Moreover, the device is very suitable for mounting directly behind the exit point of the winding machine and for synchronization therewith so that the operation directly succeeds that of the winding machine and can even take place simultaneously with the formation of a new coil by the winding machine. Thus, the production capacity of the winding machine is not reduced, while the overal efficiency of the operation is improved.

A practical embodiment of the device in accordance with the invention will be described in detail hereinafter with reference to the accompanying diagrammatic drawings in which.

Figure 1:
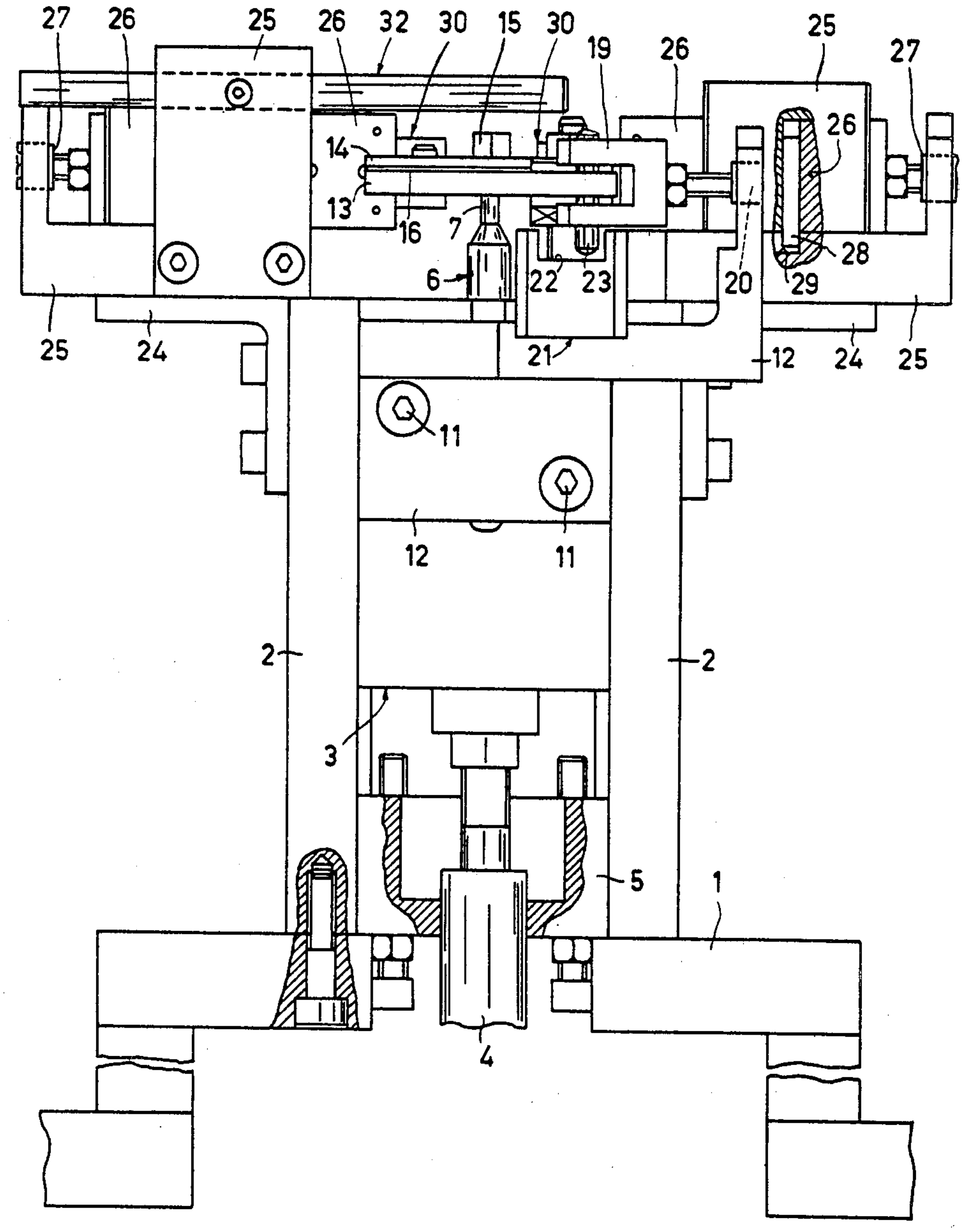
FIG. 1 is a front view of the device.
Figure 2:
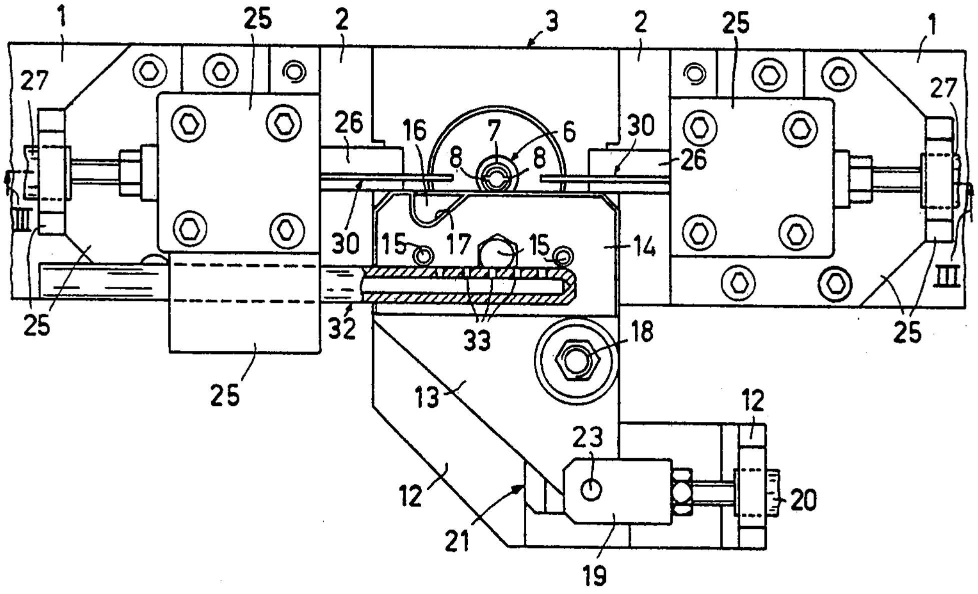
FIG. 2 is a plan view of the device.
Figure 3:
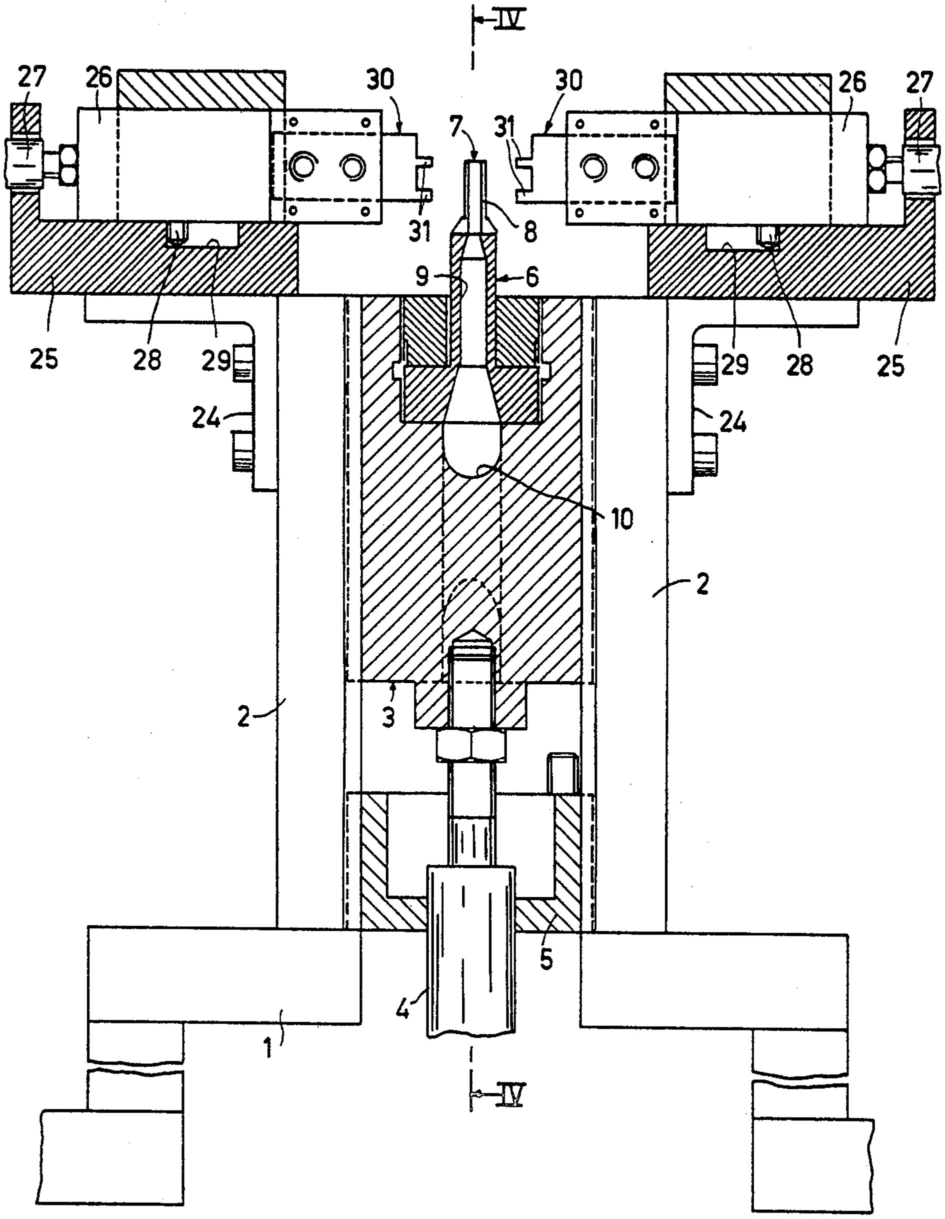
FIG. 3 is a sectional view of the device, taken along the line III—III in FIG. 2.
Figure 4:
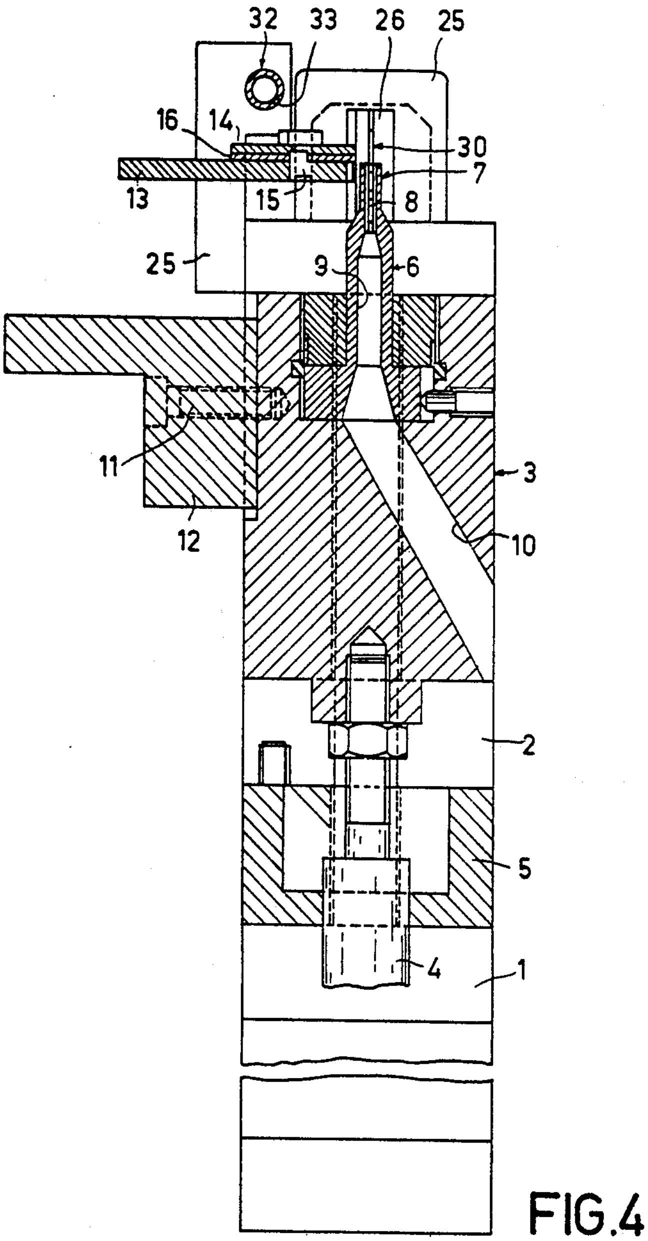
FIG. 4 is a sectional view of the device, taken along the line IV—IV in FIG. 3.
Figure 6:
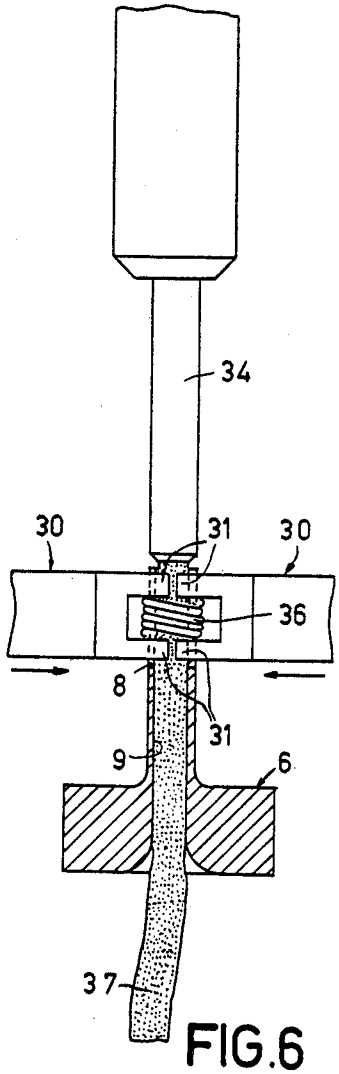
Figure 9:
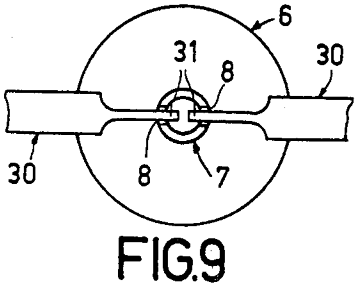
Figure 7:
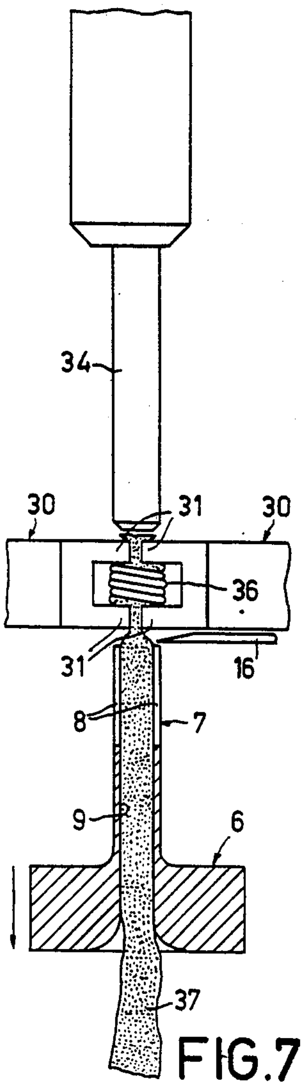
Figure 8:
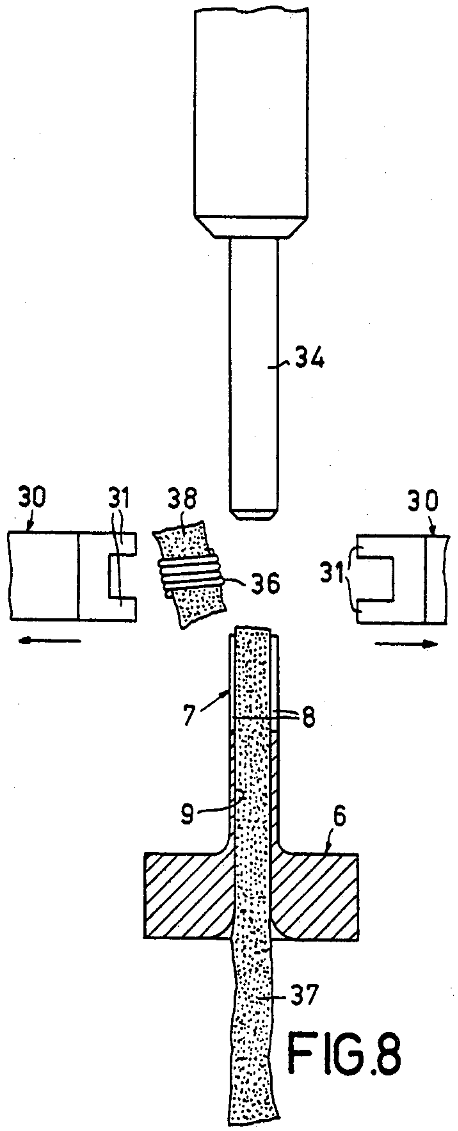
Figure 10:
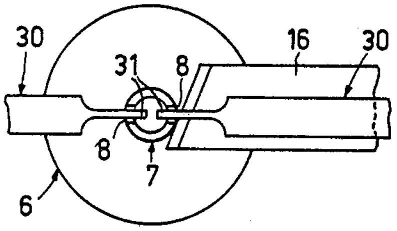

FIGS. 5 to 10 diagrammatically show successive steps in the device in sectional views as in FIG. 3;

FIGS. 9 and 10 diagrammatically illustrate the steps of the FIGS. 6 and 7 in a plan view.

The device shown in FIGS. 1 to 4 comprises a basic frame 1 with a set of supports 2 which act as a guide for a vertically displaceable slide 3 which is supported and driven by the rod of a compressed air cylinder 4 which is mounted on the basic frame 1 by way of a block 5.

The slide 3 is rigidly connected to a mandrel 6 which comprises a cylindrical end portion 7 in which a set of slots 8 are diametrically oppositely provided. The mandrel 6 comprises a bore 9, the lower end of which communicates with an oblique duct 10 in the slide 3.

On the slide 3 there is secured, by means of screws 11, a support 12 for a pivotable plate 13 which cooperates with a counter-plate 14 which includes pilot pins 15 for the positioning of a knife 16. The cutting edge of the knife exposed at the area of a profiled window 17 in the counter-plate 14 (FIG. 2) to provide for the cutting of the spongy material. The pivotable plate 13 is pivotably journalled, by means of a pin 18, on the support 12 and is driven via a pivot 23 and a fork 19 on the rod of a compressed air cylinder 20 mounted on the support 12. The pivoting movement of the pivotable plate 13 is limited by an abutment 21 which comprises a recess 22 for the displacement of the pivot 23.

On the supports 2 there are mounted, by way of L-shaped brackets 24, two blocks 25 for supporting and guiding a set of slides 26 which are situated on two opposite sides of the mandrel 6 (FIG. 3) and which are driven by compressed air cylinders 27. In conjunction with grooves 29 (FIG. 3) pins 28 guide the movements of the slides 26, each of which comprises a blocking member 30 which terminates in a set of teeth 31 which are arranged one above the other and which can be inserted into the slots 8 in the end portion 7 of the mandrel 6.

On the support 25 there is also secured a tube 32 which comprises openings 33 (FIGS. 1, 2 and 4) which are directed obliquely downwards and wherethrough compressed air can be supplied.

Figure 5:
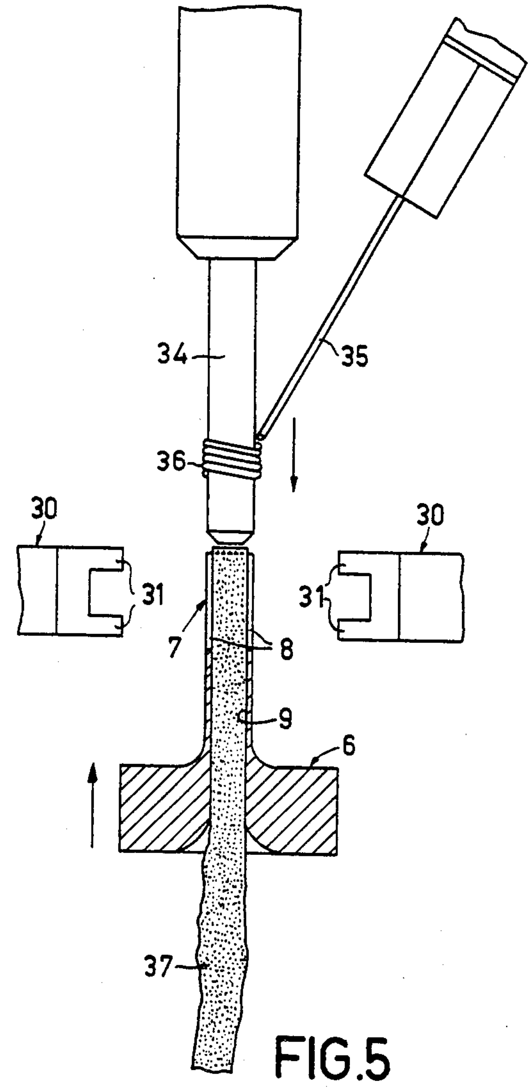

The operation of the device described above will be readily understood on the basis of FIGS. 5 to 10 which diagrammatically illustrate the use of the device in direct cooperation with a winding machine. In FIG. 5, the blocking members 30 are remote from each other and the mandrel 6 bears on the slide 3 so that it occupies a position just below the winding mandrel 34 of a winding machine (not shown), while an ejector 35 which forms a part of the winding machine slides a wound coil 36 off the mandrel 34 and onto the end portion 7 of the mandrel 6. The outer diameter of the end portion 7 equals the external diameter of the winding mandrel 34, and hence the internal diameter of the coil 36. A length 37 of a spongy material has previously been introduced, via the duct 10, into the bore 9 of the mandrel 6. Subsequently, the two compressed air cylinders 27 drive the slides 26 so that the two blocking members 30 are moved towards each other until the two sets of teeth 31 project into the slots 8, are closed around the coil 36 and together clamp the end portion of the length 37 which is present in the end portion 7 (FIGS. 6 and 9). When the compressed air cylinder 4 is actuated, the mandrel 6 is moved downwards so that the end portion 7 is withdrawn from the coil 36 and is moved out of reach of the teeth. The end portion of the length 37 is then retained by the teeth 31 so that the length 37 is pulled through the duct 10 and the bore 9. As is shown in FIGS. 7 and 10, the knife 16 is subsequently actuated by the compressed air cylinder 20 so that, in the zone between the teeth 31 and the mandrel 6, a piece of sponge 38 is cut off from the length 37.

After withdrawal of the two blocking members 30, the coil 36 with the piece of sponge 38 inserted therein can be discharged in the transverse direction (FIG. 8) by means of compressed air which is supplied via the tube 32 and the apertures 33.

What is claimed is:

1. A device for making an inductor coil comprising: An axially displaceable sleeve having a cylindrical end portion, means for introducing a length of compressible spongy material into said sleeve, means for positioning a cylindrical wire-wound coil on said end portion of the sleeve, means for clamping a length of said spongy material within said coil at either end of the coil, means for axially displacing the sleeve so as to remove the sleeve from within the coil while said length of spongy material is clamped within the coil, means operable subsequent to removal of the sleeve from within the coil for separating the length of spongy material within the coil from the remaining part of the length of spongy material within the sleeve, and means for operating said clamping means to unclamp the length of spongy material located within the coil thereby to provide an inductor coil with a core of spongy material.

2. A device as claimed in claim 1 wherein said sleeve includes at least two axially extending slots in said cylindrical end portion and said clamping means comprises at least two blocking numbers displaceable approximately transverse to the axis of the sleeve and in alignment with respective ones of said slots so as be moveable to project into the slots in a manner so as to clamp the spongy material within said coil.

3. A device as claimed in claim 2 wherein said separating means includes a cutting device moveable transverse to the sleeve axis and located so as to cut the spongy material in a zone between one end of the coil and the adjacent end portion of the sleeve after the sleeve has been withdrawn from within the coil.

4. A device as claimed in claim 1 wherein said sleeve is rigidly coupled to a slide member guidably displaceable in the direction of the sleeve axis, said slide member including an oblique duct in communication with said sleeve and in which a length of said spongy material is present.

5. A device as claimed 1 further comprising a tube supported transverse of the sleeve axis with apertures therein directed towards the coil with the spongy material core, and means for applying compressed air to said apertured tube at a time subsequent to operation of the clamping means to unclamp the spongy material thereby to eject the spongy core inductor coil from the device by means of an air flow through said apertures.

6. A device as claimed in claim 1 wherein said axially displaceable sleeve is adapted to be displaced so as come into alignment with a mandrel of a winding machine on which said wire-wound coil is arranged, and said coil positioning means includes means for sliding the coil from said mandrel onto said end portion of the sleeve.

7. A device as claimed in claim 1 wherein said sleeve includes at least two axially extending diametrically opposed slots in said cylindrical end portion, and said clamping means comprises at least two blocking members displaceable towards the axis of the sleeve from opposite directions until they project into the slots so as to clamp said length of spongy material on both ends of the coil.

8. A device for introducing an anti-microphony sponge into an air-cored coil comprising, an axially displaceable mandrel which comprises a cylindrical end portion around which a coil can be arranged and having an axial bore therein which serves to accommodate a length of a sponge material, a set of diametrically oppositely situated slots in the mandrel end portion, two blocking members displaceable towards the axis of the mandrel from opposite directions until they project into the slots thus enclosing and clamping said length of sponge material on both sides of the coil, means for axially displacing the mandrel whereby the mandrel may be displaced after the introduction of the blocking members into the slots so that the end portion of the mandrel can then be withdrawn from the coil, and cutting means which are displaceable transversely of the axis of the mandrel to cut off a piece of sponge in a zone between the blocking members and the withdrawn end portion of the mandrel.

9. A device as claimed in claim 8 further comprising means for supplying compressed air activated simultaneously with a return movement of the blocking members in order to discharge the coil with the cut-off piece of sponge from the device.

* * * * *

UNITED STATES PATENT AND TRADEMARK OFFICE
CERTIFICATE OF CORRECTION

PATENT NO. : 4,461,069

DATED : July 24, 1984

INVENTOR(S) : CESARE CHIECCHI

It is certified that error appears in the above-identified patent and that said Letters Patent is hereby corrected as shown below:

In the Title Page:

Item [62], please change the patent no. from "4,322,894" to --4,322,884--

In the Specification:

Column 1, line 7, change the patent no. from "4,322,894" to --4,322,884--

In the Claims:

Claim 2, line 4, change "numbers" to --members--

Signed and Sealed this

*Twenty-fifth* Day of *March 1986*

[SEAL]

*Attest:*

DONALD J. QUIGG

*Attesting Officer*

*Commissioner of Patents and Trademarks*